United States Patent [19]
Wallis

[11] 3,731,821
[45] May 8, 1973

[54] ARTICLE TRANSFER DEVICE

[76] Inventor: Bernard J. Wallis, 25200 Trowbridge Avenue, Dearborn, Mich.

[22] Filed: Sept. 15, 1970

[21] Appl. No.: 72,399

[52] U.S. Cl..........................214/1 BB, 74/29, 74/422
[51] Int. Cl................................................B66c 1/42
[58] Field of Search........................214/1 BB; 74/422

[56] References Cited

UNITED STATES PATENTS

| 2,943,750 | 7/1960 | Sehn | 214/1 BB |
| 3,575,301 | 4/1971 | Panissidi | 214/147 T |
| 2,867,058 | 1/1959 | Balsiger | 214/1 BZ |
| 2,894,616 | 7/1959 | Young | 214/1 BZ X |
| 619,047 | 2/1899 | Mayer | 74/422 |
| 1,437,681 | 12/1922 | Rathbun | 74/422 X |

Primary Examiner—Gerald M. Forlenza
Assistant Examiner—George F. Abraham
Attorney—Barnes, Kisselle, Raisch & Choate

[57] ABSTRACT

An article transfer device having a generally tubular-shaped member shiftable on a frame and carrying article gripping means on one end thereof. Teeth are formed in the wall of the member to provide a gear rack by means of which the member is shifted to an extended position such that the article gripping means is supported remotely from the frame in cantilever fashion.

1 Claim, 17 Drawing Figures

Patented May 8, 1973
3,731,821
5 Sheets-Sheet 1
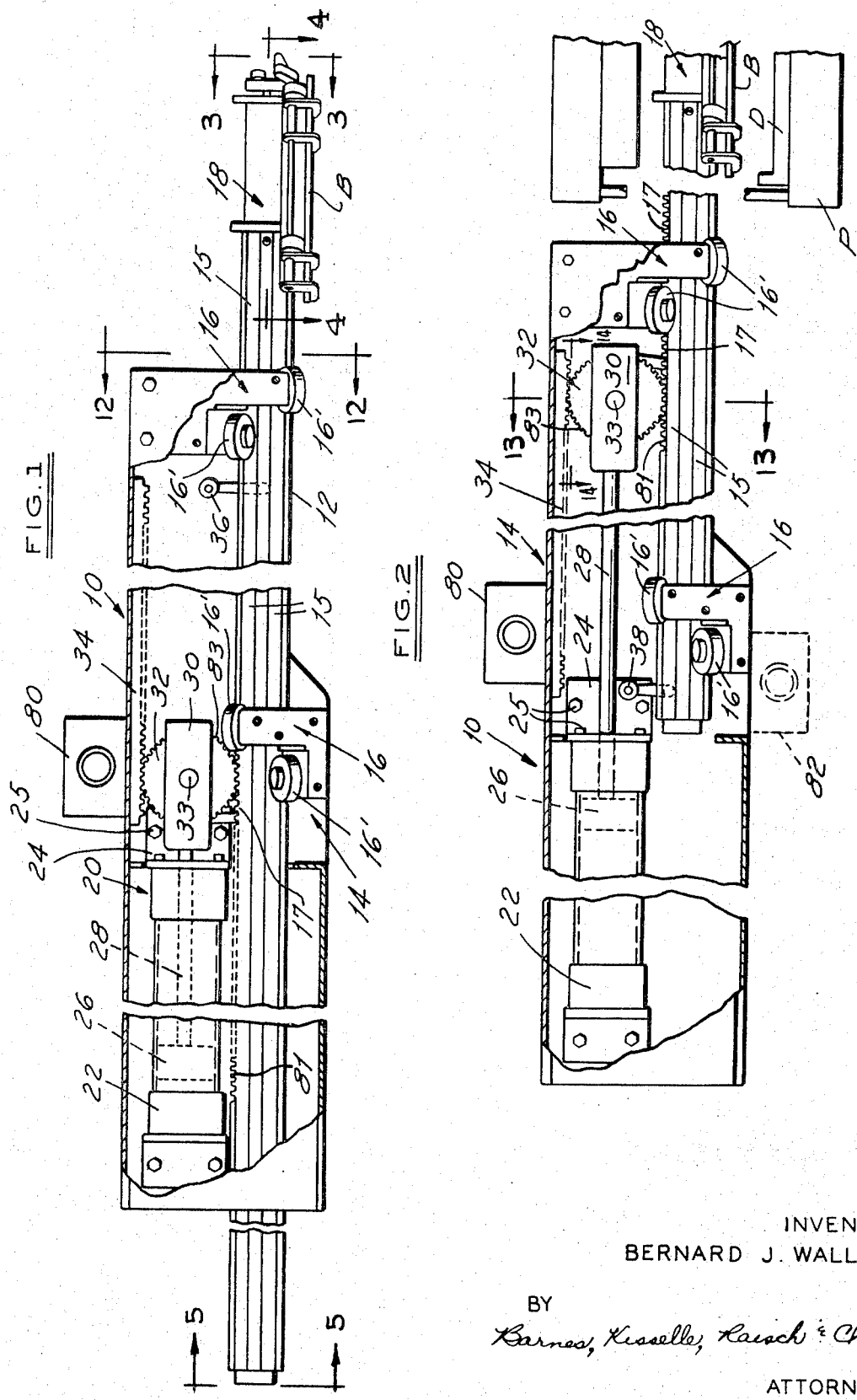
INVENTOR
BERNARD J. WALLIS
BY
Barnes, Kisselle, Raisch & Choate
ATTORNEYS Patented May 8, 1973

INVENTOR
BERNARD J. WALLIS

BY
Barnes, Kisselle, Raisch & Choate
ATTORNEYS

Patented May 8, 1973
3,731,821
5 Sheets-Sheet 4
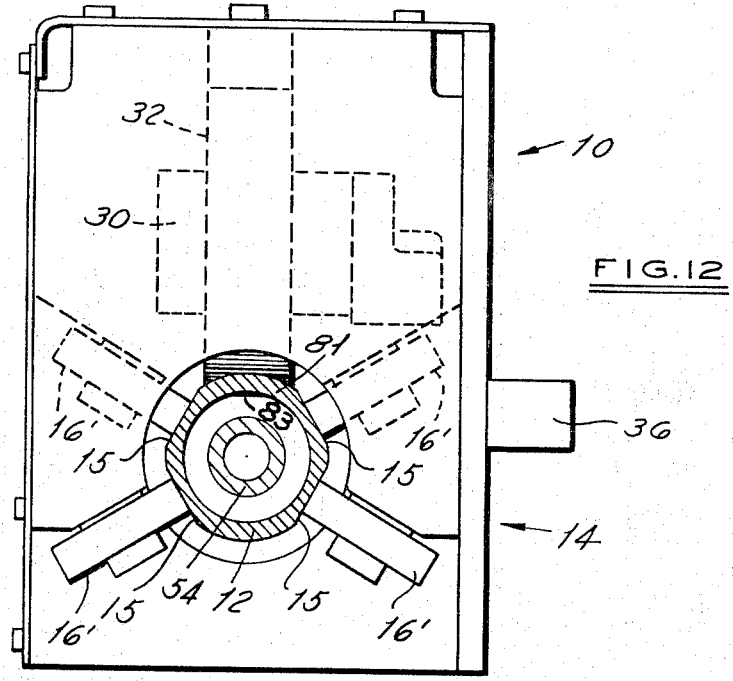
FIG.12
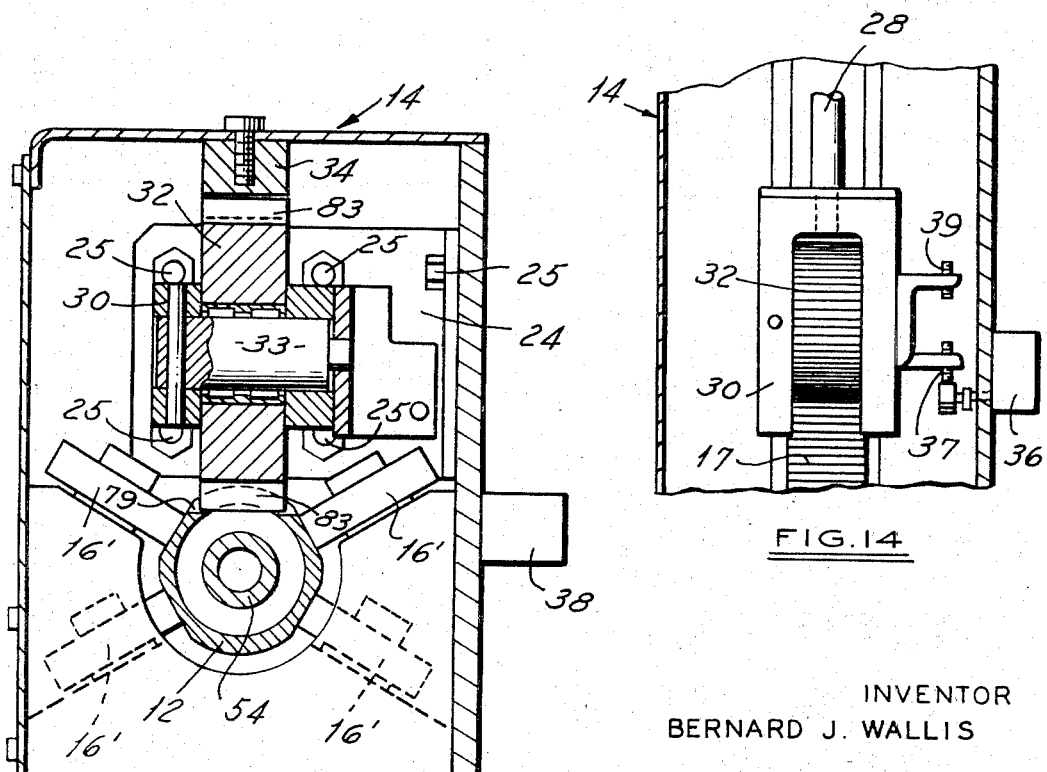
FIG.13
FIG.14
INVENTOR
BERNARD J. WALLIS
BY
Barnes, Kisselle, Raisch & Choate
ATTORNEYS Patented May 8, 1973 3,731,821

INVENTOR
BERNARD J. WALLIS

BY Barnes, Kisselle, Raisch & Choate

ATTORNEYS

ARTICLE TRANSFER DEVICE

This invention relates to an article transfer device having a single shiftable member on which article gripping means are mounted. The device may be used either as an unloader or a loader or workpieces for a press and has particular utility when operating as the latter.

The loading of articles such as flat sheet metal blanks into a press, especially where the blank is large and the press stroke short, requires the blank to be supported in such a way so as not to sag under its own weight. Hence it is virtually impossible to grip the blank adjacent one edge and insert it into the press without the blank dropping under its own weight to thereby interfere with the die as it is transferred into the press. Also the loading operation requires the blank to be accurately positioned over the die so that when released it falls within locating members in the die. To facilitate loading, the blank should be supported by the transfer device in such a manner that it remains generally flat and does not sag. In addition the stroke length of the transfer device must be sufficient to transfer the blank from a loading position external of the press to an unloading position overlying the die within the press.

It is an object of this invention to provide an article transfer device which is of compact and rigid construction and is capable of accurately shifting relatively large articles over a relatively long stroke.

It is another object of this invention to provide an article transfer device wherein the article is supported on the end of the shiftable member in cantilever fashion during shifting.

A further object of this invention is the provision of an article transfer device having a rigid but light-weight shiftable member on which the article is cantileverly supported and which has a gear rack formed integrally therewith for shifting the member.

Still another object of this invention is the provision of an article transfer device having a single shiftable member with article gripping means on one end thereof and in which the actuating means for the article gripping means is carried internally by the shiftable member so as to provide a vertically compact arrangement especially suited for shifting the article within confines which are narrow in the vertical direction.

In the drawings:

FIG. 1 is a side elevational view of the article transfer device of the present invention shown in the retracted position and having portions broken away.

FIG. 2 is a side elevational view of the article transfer device of the present invention shown in the extended position and having portions broken away.

FIG. 12 is an enlarged sectional view taken along line 12—12 in FIG. 1.

FIG. 13 is an enlarged sectional view taken along line 13—13 in FIG. 2.

FIG. 14 is an enlarged view taken along line 14—14 in FIG. 2.

Figure 3:
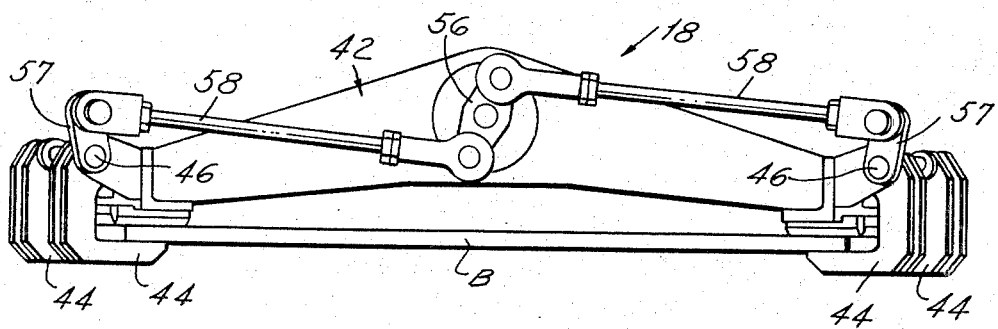
FIG. 3 is an enlarged view taken in the direction of line 3—3 in FIG. 1.

Referring to FIGS. 1, 2 and 12 the article transfer device of the present invention shown generally at 10 comprises a support arm 12 guided for axial reciprocation on a frame 14 by means of two axially spaced sets of guide rollers 16. Support arm 12 is preferably of generally tubular shape and has flat guideways 15 (FIG. 12) extending lengthwise on the outer surface thereof and engaged by the circumferentially spaced guide rollers 16′ in each set. A gear rack 17 is formed in the top side of arm 12 for a portion of its length. An article gripping means 18 is fixedly attached to one end of support arm 12 for reciprocation therewith. Article gripping means 18 is adapted to carry an article such as a sheet metal blank B for loading a die D mounted in a press P.

The drive arrangement for shifting arm 12 is shown generally at 20 and comprises a power cylinder 22 mounted parallel to and spaced above arm 12. Cylinder 22 is attached to frame 14 in part by means of a right-angle bracket 24 and bolts 25. A piston 26 is adapted to reciprocate within cylinder 22 and a piston rod 28 is connected at one end to piston 26. The other end of rod 28 is connected to a yoke 30. Yoke 30 carries a gear 32 which is adapted to rotate on a horizontal stub shaft 33 extending across the bight of the yoke. Gear 32 meshes with a gear rack 34 fixedly mounted on the top side of frame 14 parallel to gear rack 17. Gear 32 also meshes with gear rack 17 opposite its engagement with gear rack 34. Thus, with this arrangement the stroke of piston rod 28 is amplified to extend arm 12 a distance equal to twice the distance which rod 28 is shifted. Limit switches 36,38 are adapted to be tripped by their respective actuators 37,39 (FIG. 14) on yoke 30 when arm 12 is in the extended position and the retracted position respectively.

Figure 4:
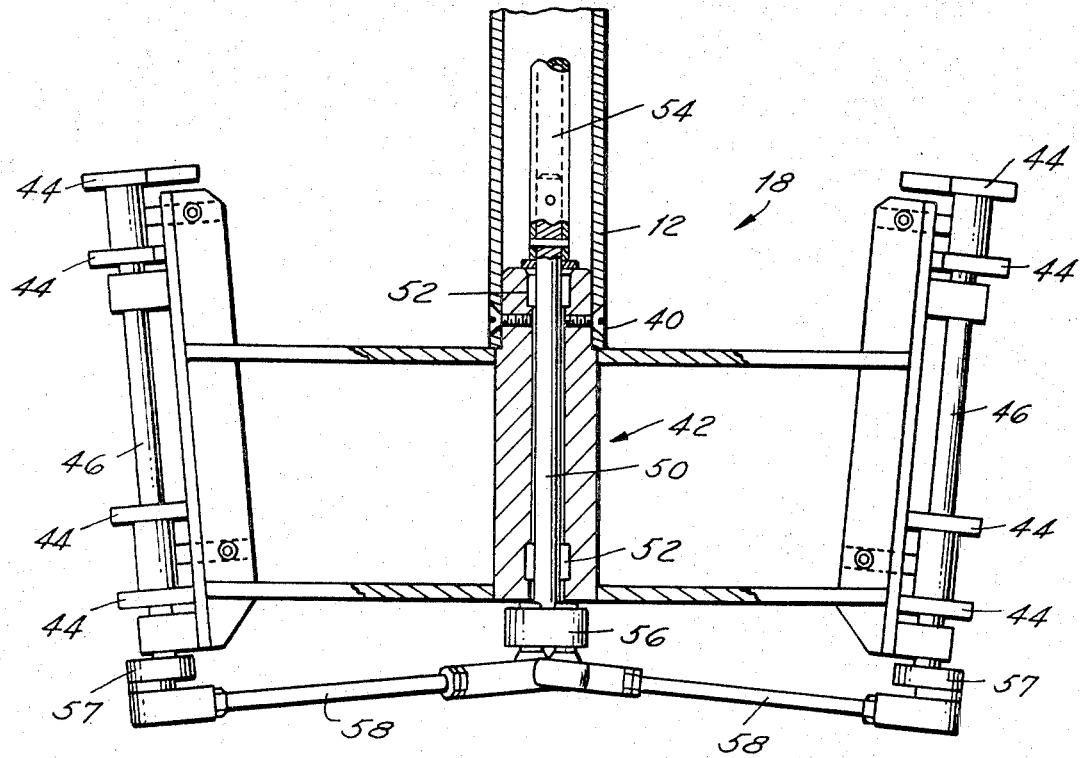
FIG. 4 is an enlarged sectional view taken along line 4—4 in FIG. 1.
Figure 5:
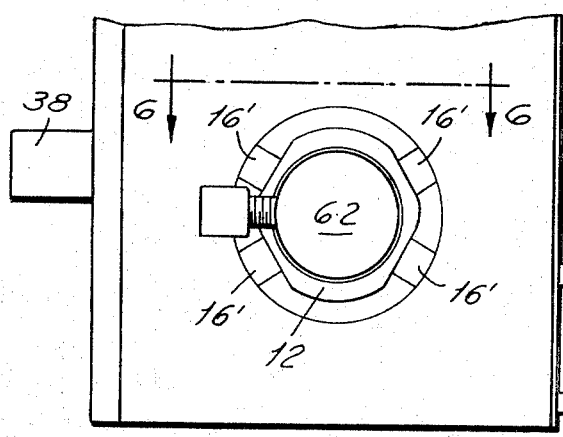
FIG. 5 is an enlarged view taken along line 5—5 in FIG. 1.

FIGS. 3 through 8, 10 and 11 show the arrangement for actuating the work gripping means 18 to thereby engage and disengage articles. Referring to FIGS. 3 and 4 in particular, gripping means 18 is fixedly attached to the end of arm 12 as at 40 and comprises a head 42. The generally C-shaped work gripping fingers 44 are attached to pivot shafts 46 supported laterally from each side of head 42. FIG. 3 shows fingers 44 in the engaged position supporting blank B. A rotary actuator shaft 50 is supported within head 42 on bearings 52 and operatively connects a coupling shaft 54 with a crank arm 56. Crank arm 56 is in turn connected with cranks 57 on shafts 46 by means of connecting rods 58. Thus, as coupling shaft 54 is rotated in opposite directions, work gripping fingers 44 are pivoted between the engaged position and the disengaged position.

Figures 10, 11:
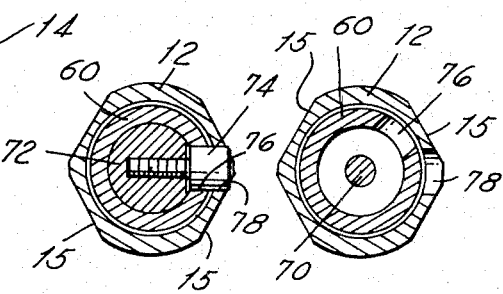
FIG. 10 is a sectional view taken along line 10—10 in FIG. 8.
FIG. 11 is a sectional view taken along line 11—11 in FIG. 8.
Figure 6:
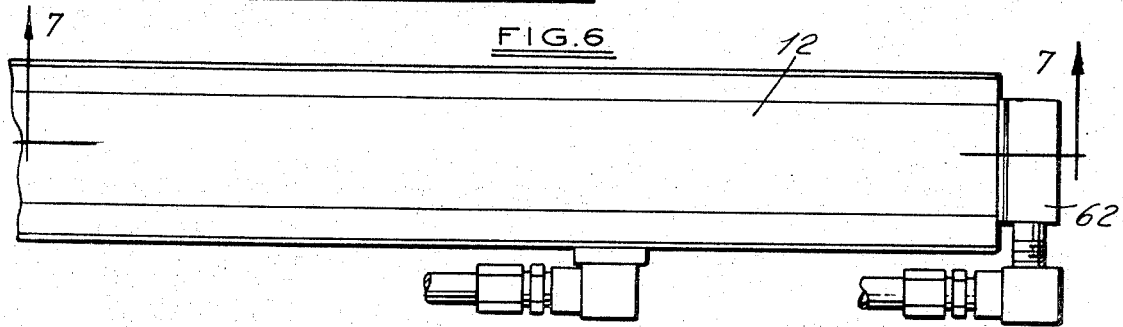
FIG. 6 is a view taken along line 6—6 in FIG. 5.
Figure 8:
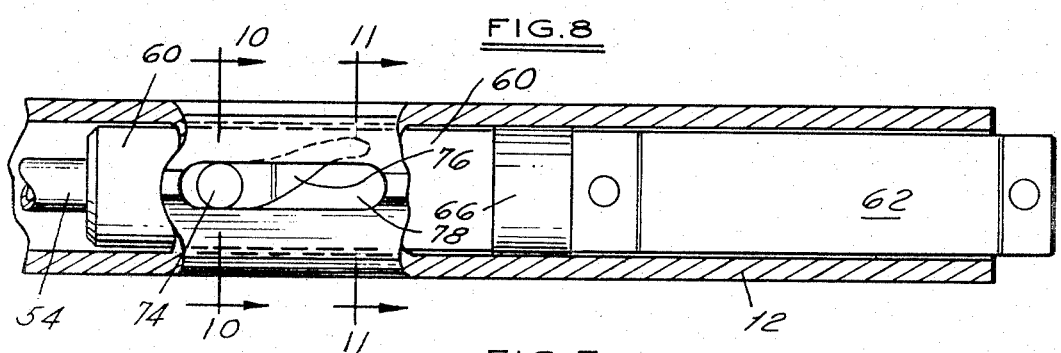
FIG. 8 is a view similar to FIG. 7 showing additional elements therein.
Figure 7:
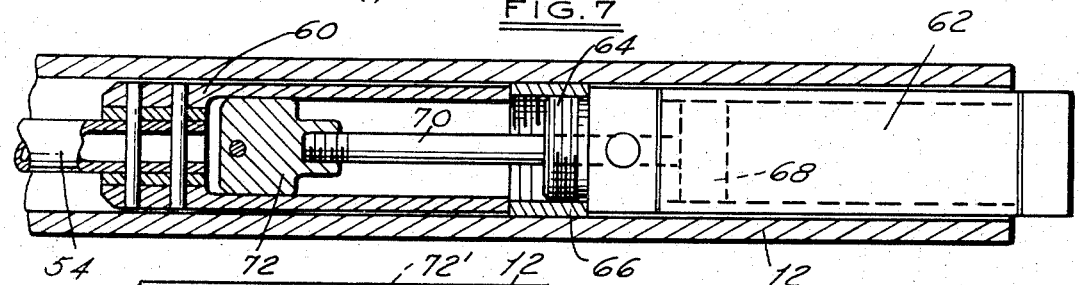
FIG. 7 is a sectional view taken along line 7—7 in FIG. 6.

Referring to FIGS. 5 through 8, 10 and 11 shaft 54 extends axially through arm 12 and has its opposite end pinned to a sleeve 60 (FIGS. 7 and 8). Sleeve 60 is adapted to rotate within arm 12 in response to the actuation of a second power cylinder 62. Cylinder 62 is threaded as at 64 to a collar 66 fixed within arm 12. Cylinder 62 comprises a piston 68 and a piston rod 70 which drive a slide 72 axially within sleeve 60. As shown in FIG. 10 a radially projecting roller 74 on slide 72 extends through a helical slot 76 in sleeve 60 and through an axial slot 78 in arm 12. Thus, as slide 72 is shifted axially the camming action of roller 74 with slot 76 rotates sleeve 60 and shaft 54 to thereby actuate fingers 44.

A pivot bracket 80 is provided on the top of frame 14 as shown in FIG. 1. Pivot bracket 80 allows the device to be adjusted on a suitable support to any desired inclination about a horizontal axis. Alternatively a pivot bracket may be mounted on the lower surface of frame 14 as shown by the broken lines 82 in FIG. 2.

The operation of the article transfer device is now described for its most advantageous use as a press loader. With support arm 12 in the retracted position of FIG. 1 article transfer device 10 is set at an appropriate inclination and distance from the press. As pressure fluid is introduced into the head end of cylinder 22, support arm 12 is shifted to the right in FIG. 1 through drive arrangement 20. Gripping means 18 carry a sheet metal blank B for loading die D and support blank B in such a way that blank B has very little sag. Since gripping means 18 is designed to be vertically compact, the transfer device is particularly useful for loading sheet metal blanks into a short-stroke press.

As arm 12 reaches the extended position, actuator 37 trips limit switch 36 to thereby stop the travel of arm 12. Limit switch 36 is adapted to be tripped when blank B is correctly positioned within press P over die D. With arm 12 in the extended position gripping means 18 and blank B are cantileverly supported from frame 14. Because arm 12 is formed of a generally tubular cross section it combines a large moment of inertia with a small cross-sectional area. In this way article gripping means 18 and blank B are rigidly supported substantially coaxial with the path of travel of arm 12 at a large distance from frame 14 with the use of a minimum amount of material. With the reduced mass of arm 12, its inertia is correspondingly reduced thereby increasing the accuracy with which it may be shifted.

With arm 12 in the extended position shown in FIG. 2 pressure fluid is next introduced into the head end of cylinder 62 to thereby shift slide 72 to the left in FIG. 7. The camming action of roller 74 with slot 76 rotates crank arm 56 on head 42. This rotation is coupled to pivot fingers 44 out of the way so as to release blank B from gripping means 18 and deposit it in die D. Because the actuating means for gripping means 18 comprising shaft 54, cylinder 62, slide 72 and sleeve 60 is carried entirely with arm 12, arm 12 affords a shiftable member having a vertically compact arrangement which is advantageous in narrow vertical confines, such as between dies in a shortstroke press.

Arm 12 may now be shifted back to the retracted position by introducing pressure fluid into the rod end of cylinder 22. When arm 12 is in the retracted position actuator 39 trips limit switch 38 to stop the motion of arm 12. Article gripping means 18 may now be brought into engagement with a subsequent workpiece by retracting piston 68.

Gear rack 17 is formed in arm 12 so as to provide openings 79 (FIG. 13) between adjacent teeth 81 which extend through the wall of the tube. As the teeth 83 of gear 32 engage rack 17 they partially extend through openings 79 between adjacent teeth 81 in rack 17 as shown in FIGS. 12 and 13. Since only a portion of the area of a drive tooth provides useful contact with a driven tooth in a conventional gearing arrangement the drive characteristics of this arrangement are in no way impaired. The wall thickness of the tube as determined by the required rigidity for cantileverly supporting gripping means 18 is sufficient to provide adequate contact area between teeth 81 of rack 17 and teeth 83 of gear 32.

Figure 9:
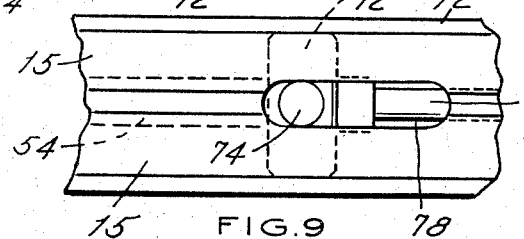
FIG. 9 is a modification of a portion of the arrangement showin in FIG. 8.

FIG. 9 shows a modification of the drive arrangement for shaft 54. Shaft 54 is directly connected to slide 72' which reciprocates within arm 12 in response to actuation by rod 70. Roller 74 is attached to slide 72' and follows axially extending slot 78 for guiding axial reciprocation of slide 72' without rotating shaft 54.

Figure 15:
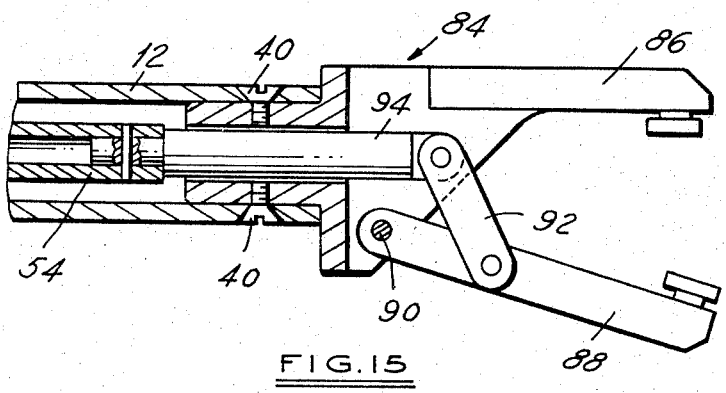
FIG. 15 shows a first modification of the article gripping means of the present invention.
Figure 16:
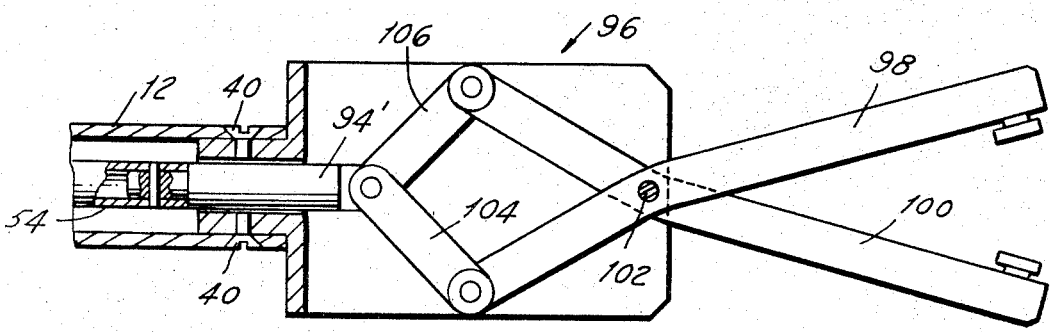
FIG. 16 shows a second modification of the article gripping means of the present invention.
Figure 17:
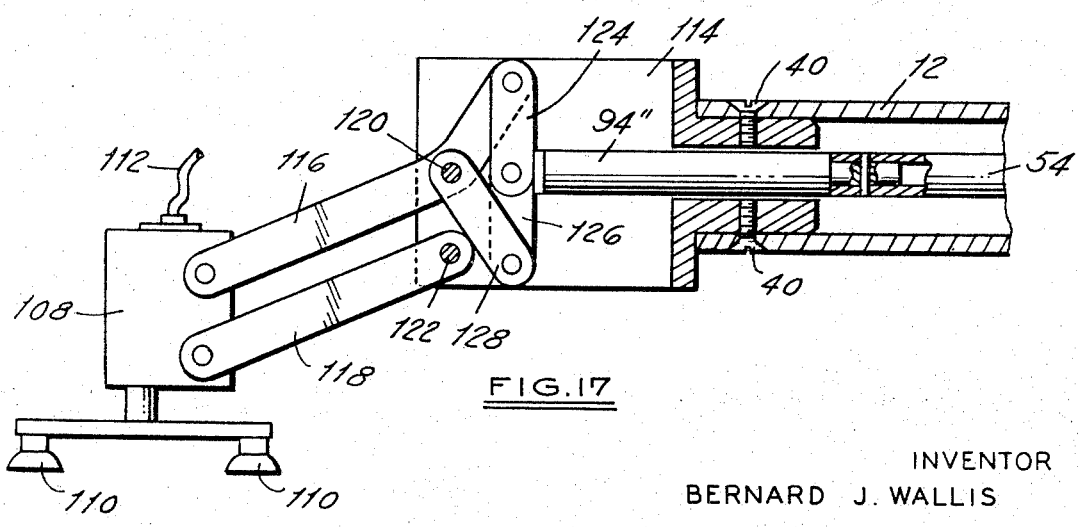
FIG. 17 shows a third modification of the article gripping means of the present invention.

FIGS. 15, 16 and 17 show modifications of the article gripping means which are suited for axial reciprocation of shaft 54. FIG. 15 shows an article gripping means of the movable jaw type with shaft 54 in the extended position and the jaw in the open position. A jaw assembly 84 is attached to arm 12 as at 40. Jaw assembly 84 comprises a fixed jaw 86 and a movable jaw 88 pivoted on jaw 86 as at 90. One end of a link 92 is pinned to movable jaw 88 intermediate its ends. The other end of link 92 is pinned to one end of an extension 94 of shaft 54. Thus, as shaft 54 is retracted, movable jaw 88 is brought into cooperation with fixed jaw 86 to thereby grip the article.

FIG. 16 shows an article gripping means of the scissors type with shaft 54 in the extended position and the scissors in the open position. A scissors assembly 96 is attached to arm 12 as at 40. Scissor arms 98,100 are pivoted intermediate their ends on assembly 96 as at 102. Links 104,106 connect the ends of arms 98,100 with extension 94' of shaft 54. With this arrangement, as shaft 54 is retracted, arms 98,100 are engaged to grip the workpiece.

FIG. 17 shows an article gripping means of the suction cup type with shaft 54 in the extended position. A bracket arrangement 108 carries suction cups 110 connected to a source of vacuum by line 112. A dog-leg-shaped link 116 and a straight link 118 support bracket arrangement 108 on head 114 which is in turn attached to arm 12 as at 40. Link 116 is pivoted on head 114 at 120, while link 118 is pivoted at 122. Links 116,118 are also pinned to bracket 108. A connecting link 124 connects the shorter portion of link 116 with extension 94'' of shaft 54. Further stability for this arrangement is provided by links 126,128. With this arrangement, as shaft 54 is retracted suction cups 110 are shifted vertically to either load or unload a workpiece.

Although the article transfer device has been described for the application of loading articles into a press to better disclose its advantageous features, it will be appreciated that its use is not restricted to this particular application, and that one skilled in the art can adapt control arrangements for the embodiments herein disclosed to operate the device in any of several possible fashions.

I claim:

1. In an article transfer device the combination comprising a frame, a tubular support arm axially shiftable on said frame between extended and retracted positions, guide means on said frame engaging said tubular arm and defining said rectilinear path, a gear rack on said tubular arm, a drive gear on said frame engaging said gear rack, drive means on the frame for rotating said drive gear in opposite directions to reciprocate said tubular arm, a hydraulic cylinder fixedly mounted within said tubular arm adjacent one end thereof and movable with said tubular arm as a unit, a piston rod connected at one end to a piston within said cylinder, said piston rod extending axially of said tubular arm and movable lengthwise in said tubular arm in response to actuation of said hydraulic cylinder, an articulated work-gripping member mounted on said arm at the end thereof opposite said cylinder and actuatable to work gripping and work releasing positions, and means operatively connected between the other end of the piston rod and said work-gripping member for actuating the work-gripping member to said work gripping and work releasing positions in response to movement of said piston rod in opposite directions.

* * * * *